United States Patent [19]

Garrett

[11] 3,754,609

[45] Aug. 28, 1973

[54] DRILL STRING TORQUE TRANSMISSION SLEEVE

[75] Inventor: William R. Garrett, Midland, Tex.

[73] Assignee: Smith International, Inc., Midland, Tex.

[22] Filed: Sept. 21, 1970

[21] Appl. No.: 73,959

[52] U.S. Cl.................. 175/323, 175/325, 285/333
[51] Int. Cl... E21b 17/043, E21b 17/10, E21c 9/00
[58] Field of Search.................... 175/320, 323, 325; 308/4 A; 285/114, 115, 116, 333, 334, 16

[56] References Cited
UNITED STATES PATENTS

| | | | |
|---|---|---|---|
| 2,745,685 | 5/1956 | Moore | 285/333 |
| 2,513,621 | 7/1950 | Boice | 308/4 A |
| 2,206,166 | 7/1940 | Dunn | 285/334 X |
| 2,320,107 | 5/1943 | Speckert | 285/333 X |
| 2,535,435 | 12/1950 | Massey | 285/333 X |
| 2,794,617 | 6/1957 | Yancey | 175/325 X |
| 2,869,827 | 1/1959 | Cook | 175/325 X |
| 3,355,192 | 11/1967 | Kloesel et al. | 285/334 X |

FOREIGN PATENTS OR APPLICATIONS

| | | | |
|---|---|---|---|
| 999,846 | 7/1965 | Great Britain | 175/320 |

*Primary Examiner*—David H. Brown
*Attorney*—Murray Robinson and Ned L. Conley

[57] ABSTRACT

A lower drill string assembly useful in the rotary system of drilling oil wells wherein a tubular drill string is rotated while fluid is circulated down the string and up the earth bore includes tubular lower drill string members, such as adjacent drill collars or two parts of a stabilizer body, interconnectable by a modified rotary shouldered connection including a mandrel between the pin shoulder and the screw, i.e., the box engaging part of the pin, and a fluid sealing, torque transmission sleeve around the mandrel between the pin shoulder and the shoulder formed by the box mouth. For safety, to avoid junking the well, means is provided to retain the sleeve on the mandrel, and the retention means, e.g. a peg and slot or loose fitting threads, allows relative axial movement of the sleeve and mandrel as required for stressing the sleeve and pin axially sufficiently to transmit axial torque through the sleeve from pin shoulder to box shoulder, thereby reducing the torque load on the pin, as well as effecting a fluid tight seal. The sleeve performs an additional function of contacting the side of the well bore, e.g., as a replaceable wear resistant unit or as a replaceable centralizer and wear protector or fixed blade reamer-stabilizer, and the safety retention means can transmit torque to the sleeve from the mandrel. A special combination of hard facings is provided on the blades of the reamer-stabilizer at the sides and ends thereof.

42 Claims, 11 Drawing Figures

United States Patent [19]
Garrett

William R. Garrett
INVENTOR.

BY Murray Robinson
ATTORNEY

DRILL STRING TORQUE TRANSMISSION SLEEVE

BACKGROUND OF THE INVENTION

1. Field of the Invention

This invention relates to torque transmitting assemblies of tubular lower drill string members, such as adjacent drill collars or two connected parts of the body of a stabilizer, which members are connected together by tapered screw threads but torque is in a large part transmitted and fluid sealing are achieved by axially prestressed, abutting, annular shoulders. Such connections are known as rotary shouldered connections and are extensively used in the rotary system of drilling.

2. Description of the Prior Art a. Tension Bolt

An ordinary straight threaded tension bolt and nut used to hold two pieces together is perhaps the simplest example of the use of resilient axial loading of a screw thread, the purpose of such loading being to prevent the nut and bolt from unscrewing. The nut is tightened sufficiently to place the bolt in tension and to place the two pieces in compression between the nut and the head of the bolt. The resultant axial loading of the thread flanks and the transverse surfaces provided by the adjacent faces of the nut and the head of the bolt increases the friction force tending to prevent the nut and bolt from unscrewing, and the elasticity of the bolt and the pieces secured together by the nut and bolt maintains the axial loading on the thread flanks and the other tranverse surfaces even if the nut and bolt are accidentally slightly unscrewed.

b. Lock Washer for nut and bolt

If the pieces being connected together are thin relative to the pitch of the threads so that any tension in the bolt or compression of the pieces being joined will be relieved by the slightest unscrewing of the nut and bolt, it is conventional to provide a resilient washer between the nut and the pieces being joined, whereby axial elastic deformation of the washer will exceed the axial travel of the nut upon rotation thereof through less than a full turn, thereby maintaining axial stress on the thread flanks and on the transverse surfaces provided by the nut, the washer and the head of the bolt, despite slight unscrewing of the nut and bolt.

c. Shouldered, Straight Threaded, Rod Joint

In the case of a straight (untapered) threaded joint between two rods, axial flank stress on the threads is achieved by providing a shoulder or transverse surface on the threaded pin to engage a correlative shoulder or transverse surface on the threaded socket: For example, an external shoulder on the pin can engage the mouth of the socket, or the end of the pin can engage the bottom of the socket. In order to maintain the flank stress despite slight unscrewing of the joint, unthreaded areas of some axial length are provided adjacent the shoulders.

d. Locking Sleeve for Shouldered Straight Threaded Rod Joint

Alternatively an unthreaded washer or sleeve can be disposed around a smooth part of the pin intermediate the shoulders of a straight threaded joint between two rods in order to maintain axial flank stress despite slight unscrewing of the connection. An example of the last mentioned construction is the armored jam joint sucker rod disclosed in the Gunn and Thompson U. S. Pat. No. 1,326,259. The jam sleeve not only prevents the straight threaded sucker rods from unscrewing, but has the additional function of centralizing the sucker rods, thereby protecting against wear on the sucker rods by keeping them out of contact with the well tubing as the rods reciprocate up and down in the tubing. When the sleeve wears out because of its contact with the tubing it can be replaced.

Somewhat similar to the Gunn and Thompson jam sleeve construction are the sucker rod sleeves shown in U. S. Pat. Nos. 1,605,316 (Wilson) and 2,307,688 (Larson). In the latter constructions, however, though the guide sleeve may be held between shoulders on pin and socket members, the sleeve does not take all the compression load because other shoulders or abutments on the pin and socket members directly engage each other.

e. Sealing Washer for Straight Threaded Tubular Connection

It is also known to use an elastic annular member between straight threaded tubular pin and socket members for the purpose of sealing therebetween. The rubber washer used in a garden hose screw connection in an example of such a construction.

None of the screw threaded connections mentioned so far is intended to transmit substantial torque as is required of a drill string used in the rotary system of drilling.

f. Bearing Sleeve

As noted in the Gunn and Thompson patent, their construction employing a jam sleeve is to be distinguished from constructions employing a bearing sleeve within which is rotatably disposed a tubular drill string element, for in the latter type of construction there is no axial stress on the sleeve and reliance is placed on the fact that the threaded connection tends to make up tighter as the drill string rotates. For example, compare the construction shown in the Shelby U. S. Pat. No. 111,689, wherein the double box tubes of a rock drill are connected by straight threaded double pin subs, each of the latter carrying a fluted sleeve within which the sub can rotate. Similar sleeves rotatably mounted on tubular drill string mandrels are shown in U. S. Pat. Nos. 1,985,229 (Allen), and No. 2,794,617 (Yancey), but in none of these does the sleeve contribute in any manner to the tube connection, neither to maintenance of the integrity of the tube connection as in Gunn and Thompson nor the transmission of torque or fluid sealing. Shoulders on the drill string members directly engage each other to seal the fluid and to transmit torque.

g. Driven Sleeves

When it is desired to cause a guide or centralizer sleeve to rotate with a rotating drill string, as in a reamer-stabilizer, the sleeve has been clutched or splined to the supporting mandrel, as illustrated by U. S. Pat. Nos. 2,323,027 (Gersten-korn), 2,572,307 (Brown), 2,620,164 (Burris), 2,665,887 (Shelton), 2,696,367 (Robishaw), 2,717,764 (Cannon), 2,790,623 (Pate), 2,869,827 (Cook). Alternatively the sleeve can be screwed to the drill string as illustrated by U.S. Pat. Nos. 1,607,941 (Bowser), 1,770,207 (Helmling), 1,803,267 (McClosky), 2,440,441 (Hanes), 2,589,534 (Buttolph), 3,075,590 (Cook), 3,322,217 (Cook). The threaded connection of the sleeve to the rotating drill string member serves also as a safety device to position the sleeve axially on the drill string, preventing loss in case the portion of the drill string therebelow should part. But in none of these constructions is the sleeve in compression so as to maintain the integrity of the threaded connection between the tubular members and in none of these does the sleeve form a seal or transmit torque from one drill string member to another.

h. Taper Threaded Tubular Connection With Radial Flank Stress

In the case of a taper threaded connection, e.g., as in ordinary household water pipes, as the connection is made up tight the advance of one taper on the other causes the pin to be placed in radial and circumferential compression and the socket to be placed in radial compression and circumferential (hoop) tension. This causes flank stress on the threads creating sufficient frictional resistance to prevent accidental unscrewing of the connection. Such low pressure connections, operating usually at less than 100 pounds per square inch pressure, are sealed by filling the helical spaces between the threads with a viscous fluid or cement.

For a variety of reasons, most oilfield drill string connections, i.e., connections between drill collars, drill pipes and other tubular members making up the bit stem extension used in rotary drilling are taper threaded. Such reasons include better balance of strength of the connection, easier stabbing in make up, quicker release on break out, and greater ease of reworking.

i. Shouldered Taper Threaded, Tubular Connection with Axial Flank Stress

Although drill string connections are usually taper threaded, it is not primarily advance of box taper along pin taper creating thread flank stress that keeps the connections from unscrewing. Drill string connections must transmit high pressure fluid and high torque under the stress and strain of axial loading and lateral bending. As the drill string rotates, the pins tend to make up tighter in the sockets. To prevent the pins from bursting the sockets, or at least to limit the hoop stress, it is usually desirable to provide engaging shoulders on the pin and socket members limiting the degree of makeup. If reliance were placed on radial and circumferential stress caused by thread taper for keeping the connection tight enough to prevent accidental unscrewing, it would be necessary to maintain close tolerances on the distances between the shoulders and the apices of the taper cones, and, in addition, thread wear could not be tolerated because it would loosen the connection. Therefore in such rotary shouldered connections axial stress is applied to the threads, there being unthreaded portions in the box and on the pin where sufficient axial strain can be built up. To the extent that the thread flanks depart from planes perpendicular to the axis of the connection, there will not only be axial but also circumferential and radial stress in the connection, but this is a result primarily of the axial stress, not thread taper.

j. Torque Transmission

Perhaps the principal reason for using such engaged shoulders on the pin and box is to transmit most of the torque from the box on one member directly to the other member through the shoulders instead of from box to pin and thence through the pin to the other member. In this regard, rotary shouldered connections having tapered threads are to be distinguished from connections having straight threads.

For example the aforementioned Gunn and Thompson locking sleeve for sucker rods construction is not intended to transmit any substantial torque since the rods merely reciprocate when in use. Gunn and Thompson show a straight threaded screw connection and they state that their locking sleeve can be made not only of cast iron or malleable cast iron but can also be made of wood, paper fiber or raw hide. All of the latter three materials have a much lower shear strength and modulus of rigidity than the steel sucker rods. Since an unshouldered straight threaded connection is not capable of transmitting torque, if a paper fiber or wood or raw hide locking sleeve were used as suggested by Gunn & Thompson, it would collapse under load if an attempt were made to transmit drilling torque through it. On the other hand the axial loads on the Gunn and Thompson connection are transmitted to the box through the metal of the threaded pin without appreciable extra loading of the sleeve so that a paper fiber or wood or raw hide sleeve is permissible.

If a cast iron or malleable cast iron sleeve were used in place of the paper fiber or wood sleeve, as is also taught by Gunn and Thompson then it would be possible to transmit torque through the Gunn and Thompson connection, but such a sleeve would not be most suitable for a taper threaded connection wherein some of the torque is transmitted through the threads of the pin and box. This is because cast iron has a lower modulus of rigidity, i.e., shear modulus of elasticity, than the steel of which the members being connected are made. The ratio of the modulus of rigidity for cast iron to that of steel is around 70%. Torque in the sleeve would effect a greater angular displacement than that required to torque load the pin which would thus tend to turn slightly in the box. To the extent the pin turns in the box there is fretting of the threads with the variation in load due to torsional vibration while drilling; to the extent the pin does not turn in the box, more torque is taken by the pin which is undesired.

k. Sealing

Primary reliance is also placed on the shoulders of a rotary shouldered connection for sealing against the high pressure of the drill-ing fluid, e.g., over 1,000 pounds per square inch.

In the case of drill pipe, which is run in tension, the shoulders must remain in torque transmitting and sealing contact despite elongation of the pin under load tension. It is for these reasons, as well as that of the need for keeping the connection from unscrewing, that axial stress in the connection is desired. There are provided unthreaded areas at the base of the pin and the mouth of the socket of tool joint connections, such unthreaded areas being placed in tension (pin) and compression (socket) when the connection is intially made up. Additional tension in the pin will then not immediately open up a gap between the shoulders, for the socket mouth will expand under its initial compression so as to maintain the sealing shoulders in contact.

l. Lower Drill String Connections

In the case of drill collars and other drill string members at the lower end of a drill string, the problem of maintaining sealing and torque transmitting shoulder contact is somewhat different. The lower part of a drill string is usually run in compression so the problem of simply pulling the shoulders apart in tension is not usually present. On the other hand, whereas drill pipe is thin and flexible compared to the thick walled tool joints used to connect lengths of drill pipe, drill collars and other lower drill string members, such as reamers and stabilizers, are thick walled rigid members compared to the pins of the threaded connections therebetween. Therefore, when bending occurs at the lower part of a drill string, it occurs mostly in the connections. Bending at a connection tends to separate the shoulders.

With compressive loading on the lower part of the drill string exceeding the critical column loading, the drill string buckles until it is in contact with the side of the hole being drilled. It is the connections between the drill collars and other lower drill string members which bend until such wall contact occurs. Such extreme bending is very likely to open a gap between the seal shoulders of the connection. This not only tends to create a leak, but reduces the shoulder area available for torque transmission, causing excessive loading of the pin. Resultant pin failure on drill collars and other lower drill string members is not uncommon. Maintenance of the integrity of the joint in a lower drill string connection thus involves much more than merely keeping the connection from coming unscrewed.

To maintain a line of distinction between lower drill string members, which are run in compression, and upper drill string members which are run in tension, it is to be observed that the ratio of the cross sectional area of the wall of a tubular lower drill string member taken perpendicular to the tube axis of the member, to the similarly taken cross sectional area of the flow passage through the member is of the order of three to one, i.e., at least two to one, whereas for upper drill string members, such ratio is of the order of one to three.

It is further to be observed that the connections between lower drill string members usually employ a box that is externally flush with the outer periphery of the body of such member, but despite this fact, it is possible to transmit the required torque through the shoulders because the great wall thickness of the lower drill string members permits the shoulders to have a very large area.

Lower drill string members are further to be distinguished from sucker rods which operate in tension and, as in the case of upper drill string members, employ connections which are more rigid than the main part of the lengths thereof, the connections being of larger diameter than the rods or the drill pipe connected thereby.

SUMMARY OF THE INVENTION

In accordance with the invention a steel sleeve is interposed between the shoulders of a tubular steel lower drill string taper threaded pin and box connection. The sleeve is disposed around a mandrel portion of the pin between the pin shoulder and the screw portion of the pin, i.e., the part of the pin that engages the box. The sleeve is compressed between the pin shoulder and the shoulder provided by the mouth of the box. The sleeve has sufficient length to enable a large amount of deformation within the elastic limit of the materials, so that the initial compressive strain of the sleeve can be in excess of the strain to be expected when the connection is bent to the full amount involved in contacting one side of the hole when the drill string connections about 30 feet above and below are at the opposite sides of the hole, as may occur when the drill string buckles under compressive loading. The ends of the sleeve will therefore remain in fluid sealing and torque transmitting engagement with the shoulders of the threaded connection. Such an assembly may be called a flexible lower drill string connection because it can flex without leaking or losing full torque transmission ability.

To prevent accidental loss of the sleeve in the well bore, there preferably is provided axial travel limit means between the sleeve and pin. Such means may, for example, take the form of a peg in the sleeve engaging a slot in the mandrel, so as not to interfere with sleeve compression. Preferably such means comprises interengageable screw threads on the inside of the sleeve and outside of the mandrel, there being sufficient axial play between the threads so as not to interfere with axial compression of the sleeve.

The sleeve is desirably provided with wall contacting means, either in the form of low profile wear resistant means such as hard facing or protuberant means to centralize the adjacent lower drill string members, with flow passage means therethrough to allow fluid flow therepast through the annulus, and to ream out the well bore if undergaze. With the addition of such protuberant wall contacting means the flexible lower drill string connection becomes a replaceable sleeve fixed blade reamer-stabilizer.

The peg and slot or screw threads that are used to limit relative axial travel of the sleeve and pin also serve as anti-rotation means to prevent rotation of the sleeve on the pin which might be caused if the torque on the sleeve imposed by the wall contacting means, especially in the case of protuberant wall contacting means, exceeds that which causes slippage at the torque transmitting shoulders. The anti-rotation means enables greater torque to be transmitted to the wall contacting means and prevents shoulder slippage which is detrimental to the sealing surfaces thereof.

For a more detailed description of preferred embodiments of the invention reference will now be made to the accompanying drawings.

DESCRIPTION OF PREFERRED EMBODIMENTS

Figure 1:
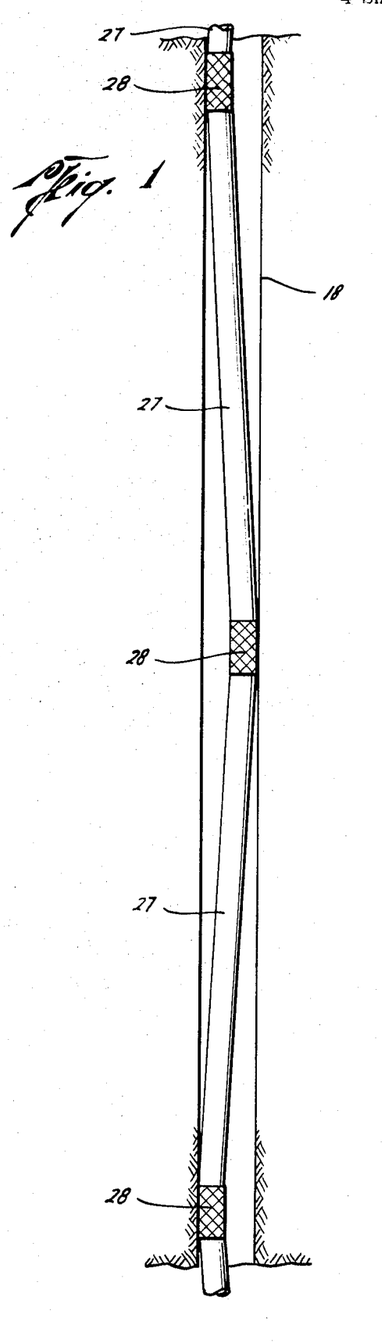
FIG. 1 is a vertical section through a well showing in elevation lower drill string assemblies in accordance with one form of the invention comprising drill collars and locking wear sleeves.
Figure 2:
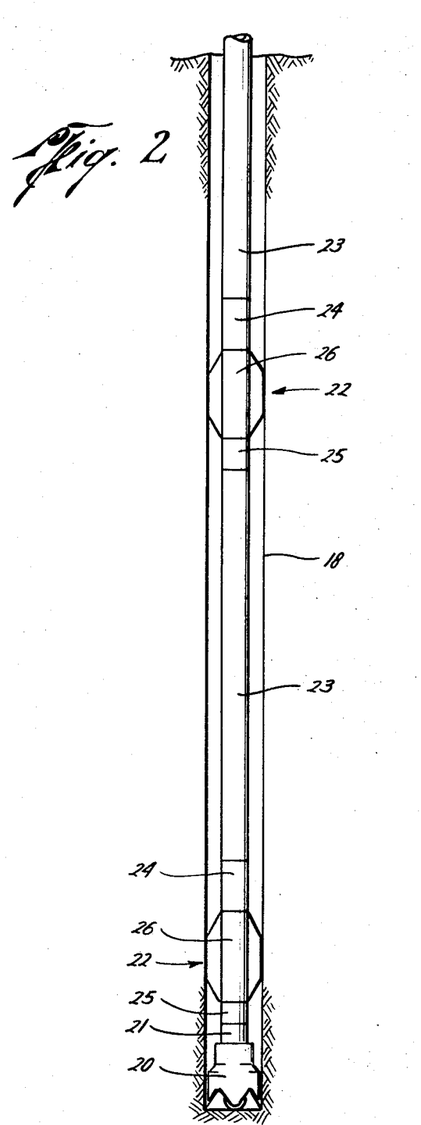
FIG. 2 is a vertical section through a well bottom showing in elevation lower drill string assemblies in accordance with another form of the invention comprising replaceable sleeve fixed vertical blade reamer-stabilizers which are shown disposed between drill collars and between the lower drill collar and a drill bit sub.

Referring to FIGS. 1 and 2, there is shown an earth bore 18 within which are disposed members forming elements of the lower part of a drill string used in the rotary system of boring holes in the earth, e.g., for wells for oil and gas. The lower drill string members making up the portion of the drill string shown in FIG. 2 include, starting from the bottom of the well bore, a rock bit 20, a sub 21, a plurality of reamer-stabilizers 22 embodying the invention, and a plurality of conventional drill collars 23. Each stabilizer includes upper and lower members 24, 25 and a torque sleeve 26.

The lower drill string members making up the portion of the drill string shown in FIG. 1, which represents an upward continuation of the portion of the drill string shown in FIG. 2, include a plurality of special drill collars 27 connected together by flexible connections in accordance with the invention, which include torque sleeves 28.

It will be observed from FIG. 1 that due to the fact that the lower drill string is loaded in compression beyond the elastic stability critical point for long columns, it has buckled, and the bending is occurring primarily at the sleeves 28. The sleeves are therefore in contact with the well bore 18, and to prevent too rapid wear they are provided with hard facing. The portion of the lower drill string shown in FIG. 2 is also loaded in compression beyond the critical point for columns but the reamer-stabilizers centralize this portion of the drill string with respect to well bore so that the buckling is less apparent.

With regard to buckling it is to be noted that the load on a lower drill string at the drill bit end thereof may be of the order of one hundred thousand pounds for a string of 20 drill collars. Two adjacent drill collars having a combined length of 60 feet and a radius of gyration $r$ of 4 inches will have a slenderness ratio $l/r$ of 180, which is well over 50, so that Euler's formula for a column with one end fixed and one end free is applicable. By "applicable" it is meant that the column will buckle before the stress reaches the yield point. According to Euler's formula, the maximum centrally placed load P which a column with its lower end free and its upper end fixed can carry without buckling is $$P = \pi^2 EA(r)^2/4(l)^2$$

From this formula it appears that the critical load for such a pair of drill collars having a radius of gyration $r(= \sqrt{I/A})$ of 4 and a cross sectional area of 50 square inches is of the order of 100,000 lbs. so that at least the lowermost pair of drill collars is loaded sufficiently to cause buckling. With greater loads or with smaller drill collars, it is possible that, as shown, the drill string may bend oppositely at every connection between the collars.

1. First Embodiment

Figures 3, 4:
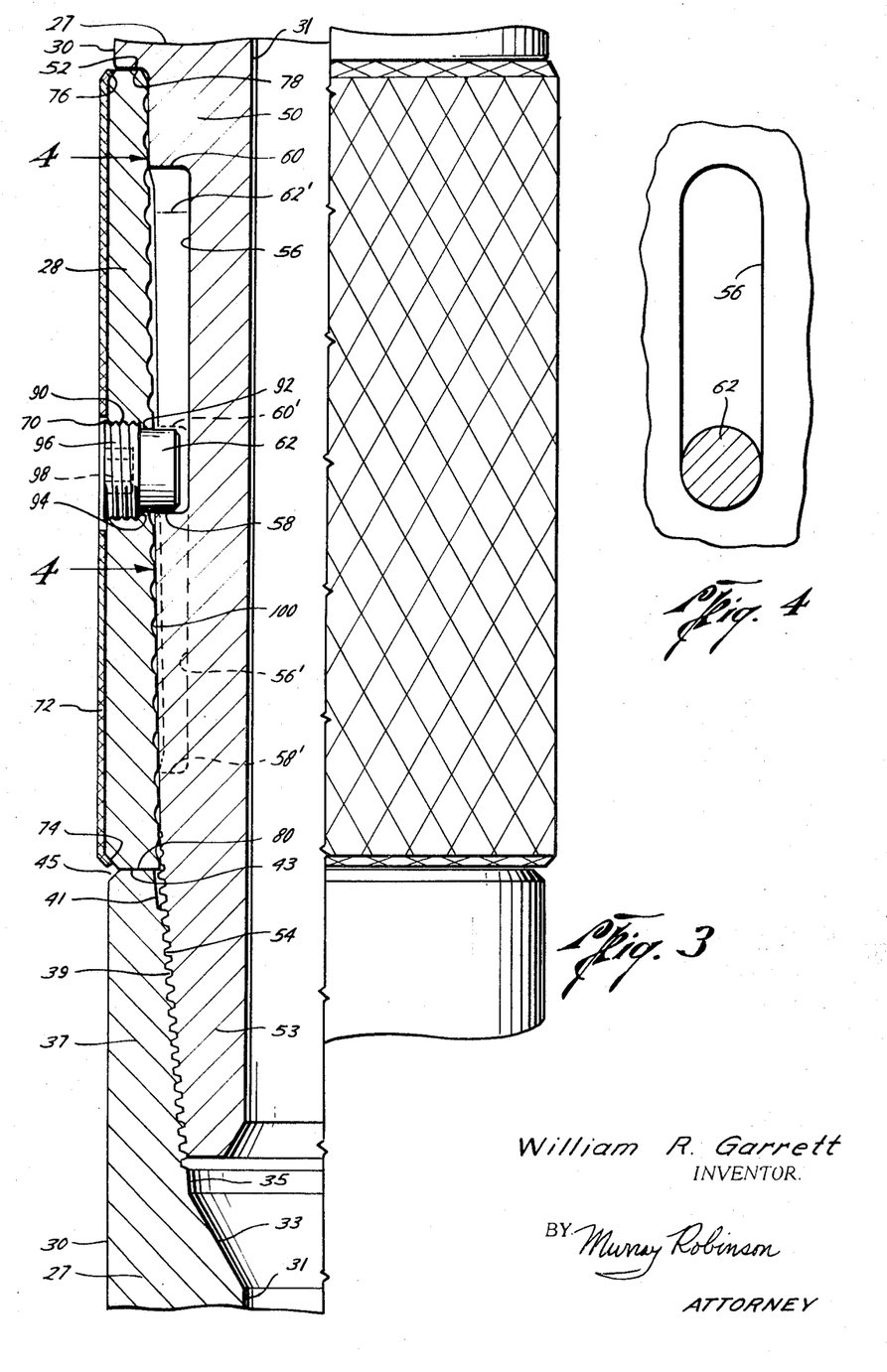
FIG. 3 is an elevation partly in section, showing to a larger scale a lower drill string assembly of the form shown in FIG. 1.
FIG. 4 is a fragmentary detail of a part of the assembly shown in FIG. 3.

Referring now to FIG. 3, there are shown the details of the connections between drill collars 27, two such collars and the connection between them forming a lower drill string assembly in accordance with the invention. Each drill collar 27 has a generally cylindrical outer periphery 30, although other configurations may be used. Interiorly each drill collar is provided with a longitudinal fluid passage 31 extending from one end of the collar to the other; passage 31 also being cylindrical in the usual case. The ratio of the cross-sectional area of the wall of the drill collar taken perpendicular to the tube (longitudinal) axis of the collar to the similarly taken cross sectional area of the flow passage 31 is in excess of three to one, as is typical of drill collars. The drill collars are made of metal, preferably steel, i.e., a high strength material.

At the upper end of each drill collar 27 the flow passage 31 flares upwardly at 33 to merge with the upwardly flaring socket 35 of box 37, the box being internally threaded at 39 from adjacent the unthreaded mouth 41 of the socket to adjacent the bottom of the socket where it joins flaring transition portion 33. The end 43 of the box is a smooth plane annular surface perpendicular to the collar axis, adapted to make sealing engagement with another surface and also providing a shoulder adapted to take axial compressive loading sufficient to enable torque about the collar axis to be transmitted by frictional engagement with another surface. Preferably the outer rim of the end of the box is bevelled as shown at 45.

At the lower end of each drill collar 27, the collar is of reduced outer diameter compared to the diameter of the outer periphery 30 of the main body portion of the drill collar, forming a pin including a downwardly tapered mandrel 50. At the juncture of the mandrel 50 and the main body of the drill collar is formed a downwardly facing shoulder 52. Shoulder 52 provides a plane smooth annular surface perpendicular to the axis of the collar and adapted to make sealing engagement with another surface and to take axial compressive loading sufficient to enable torque about the collar axis to be transmitted by frictional engagement with another surface. The drill collar pin further includes, at the lower end thereof below mandrel 50, a tapered screw 53 having a thread 54 for engagement with the similar thread 39 of the box 37 of an adjacent drill collar.

Figure 5:
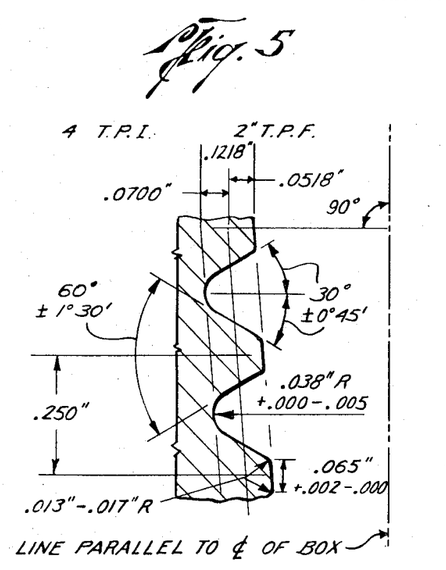
FIGS. 5 and 6 are vertical fragmentary sections to an enlarged scale showing the A.P.I. (American Petroleum Institute) standard threads of the internal flush connection between the lower drill string members, which may be used in both embodiments of the invention.
Figure 6:
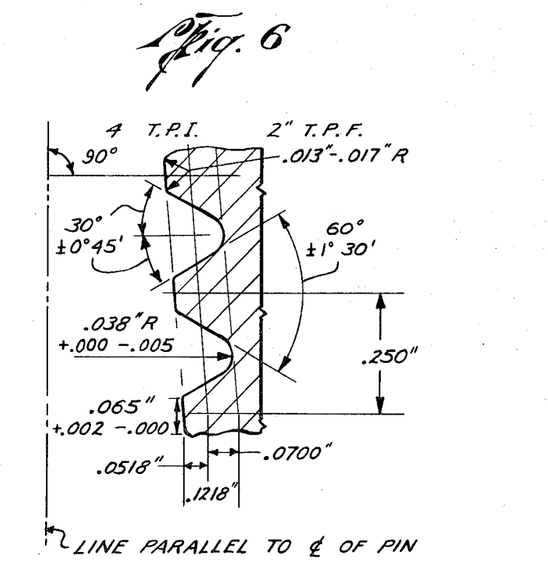

The detail of suitable thread forms for threads 39 and 54 is shown in FIGS. 5 and 6, FIG. 5 showing the box thread profile and FIG. 6 showing the pin thread profile. The dimensions are suitable for a wide range of sizes of drill string members.

Referring again to FIG. 3 and also to FIG. 4, the mandrel 50 is tapered, e.g., with a taper of about one-half inch per foot, flaring upwardly from screw 53 to shoulder 52. The mandrel is smooth except for a slot 56 extending from lower end wall 58 to upper end wall 60. The slot is extended to loosely receive a peg 62 and actually needs to extend only from wall 58 to the broken line 60' for functioning thereof. The additional length of the slot makes it unnecessary to machine a new slot when the drill collar is reworked by cutting it off shorter at the lower end and reforming the mandrel 50, shoulder 52 and screw 53. The broken line 56' indicates the position of the bottom of the slot and the broken lines 58', 60' represent the positions of the lower and upper ends of the slot relative to thread 54 when the drill collar has been reworked; the lower end of the slot then being closely adjacent to the upper end of the thread. To allow for reworking even if the pin should break off adjacent the unthreaded mouth 41 of box 37, slot 56 is shown to have a length exceeding the axial extent of peg 62 by a distance of the same order of magnitude as the axial extent of the threaded portion of the box, that being substantially the length of the part of screw 53 which threadedly engages box 37. The center line 62' shows the location of peg 62 relative to slot 56 when the collar is reworked to the limit of slot 56.

As shown in FIG. 4, the width of slot 56 is such as to snugly but slidably engage peg 62.

Referring again to FIG. 3, the metal torque sleeve 28 is disposed around the mandrel 50. The sleeve is preferably made of a material having a modulus of rigidity substantially the same as that of the drill collars, preferably a steel, i.e., a high strength material. The outer periphery 70 of the sleeve is generally cylindrical, preferably of the same diameter as that of the drill collars. The outer periphery is preferably coated with hard facing material e.g., sintered tungsten carbide, welded to the outer periphery of the sleeve, as shown at 72. The hard facing extends over the bevels 74, 76 adjacent to the ends of the sleeve. The ends 78, 80 of the sleeve are smooth plane surfaces perpendicular to the sleeve axis and are adapted to seal with the surfaces of shoulders 43 and 52 and to transmit therebetween torque about the sleeve axis by frictional engagement therewith when the sleeve is compressed between the shoulders by box 37 being made up tight on screw 53.

Typically, with pin and box thread pitch of four threads per inch, the pin and box will be made up about one or two inches on the circumference beyond hand tight, corresponding to about one tenth of a revolution, or an advance of 1/10 times 1/4 equals 0.025 inch axially. This exceeds the 0.020 inch difference between the lengths of the inner and outer fibers at the point of bending when a typical 6⅝ in. diameter drill collar is buckled in an 8⅝ inch diameter hole.

With a sleeve of a little over a foot in length, this amounts to a strain of 0.002 corresponding to a compressive load of 0.002 times 30,000,000 equals 60,000 lbs. per square inch. This compares with a stress of 600,000 lbs. per square inch that would be required if the same axial deformation were confined to the unthreaded mouth portion of a conventional box, such mouth portion being typically about one tenth of a foot in length or less. Clearly such a stress exceeds the elastic limit of steel, so that such ordinary connections cannot be compressed sufficiently to insure that the shoulders will not separate when the drill string buckles. It will be appreciated that the longer is sleeve 28, the greater the axial deformation that can occur without exceeding the compressive strength of the sleeve, and the greater the deformation, the more slight relative rotation of the adjacent connected drill collars can be tolerated without loosing the integrity of the connection, i.e., ability to transmit torque, to seal, and to remain screwed together. The present invention is therefor to be distinguished from conventional pin and box drill collar connections in that the unthreaded area that is in compression is very long, e.g., of the same order of magnitude as the diameter of the drill collars, i.e., at least about half a foot. The sleeve of the present invention is typically under a compressive stress of at least 50,000 lbs. per square inch, close to but beneath the yield point, and has a length exceeding its inner diameter.

In the latter regard it is to be noted that the compression of the sleeve places the mandrel in tension and the load is taken by the flanks of threads 39 and 54 resulting in tight frictional engagement which prevents the connection from accidentally unscrewing. In addition, the engaged shoulders 43–80 and 52–78 are brought into tight sealing engagement to prevent the escape of drilling fluid from the fluid passages 31 through the drill collars. Finally, the friction created between the engaged shoulders 43–80 and 52–78 is sufficient to transmit the required drilling torque, substantially eliminating the necessity for the torque to be transmitted through the pin via mandrel 50 and screw 53. Diversion of the torque, which may be of the order of 10,000 lb.-ft., from the pin, i.e., the mandrel and screw, to the sleeve, is perhaps the most important function of the torque sleeve 28.

Midway of the length of sleeve 28 and extending radially inward from the outer periphery thereof is a threaded hole 90. An unthreaded radial hole 92 is concentric with hole 90 and extends outwardly from the inner periphery of the sleeve to form at its junction with hole 90 a shoulder 94. Peg 62 has a threaded head 96 of larger diameter than the rest of the peg; the head is adapted to be screwed into hole 90 and engage shoulder 94. A hexagonal wrench socket 98 is provided in the head of peg 62 whereby it can be screwed tightly into hole 90. The peg can then be locked in place by spot welding.

The body of peg 62 extends through hole 92 into the slot 56 in mandrel 50. The depth of slot 56 is such that peg 62 does not contact the bottom of the slot. The bottom of the slot is parallel to the mandrel axis so that after reworking of the collar, the depth of the slot remains the same.

Peg 62 and slot 56 provide safety means to retain the torque sleeve on the mandrel even if the box 37 should become unscrewed or if the screw 53 should break off during use of the drill collars. However because the peg and slot permit limited relative axial movement of the sleeve and mandrel, there is no interference with axial compression of the torque sleeve as is required to enable it to perform its torque transmitting and other functions.

In connecting screw 53 and box 37, it is desirable to use a thread dope to prevent galling of the threads and of the pairs of engaged shoulders 43–80 and 78–57. To enable excess thread dope to escape from between the threads, the interior of sleeve 28 is helically grooved at 100. As the screw and box are made up, thread dope squeezed from the large diameter ends up the threads can escape both between shoulders 43–80 and also, after traversing groove 100, between shoulders 78–52.

Except for groove 100 the inner periphery of sleeve 28 is a smooth conical surface tapered correlative to the mandrel taper and having a cone apex located such that when the upper end of sleeve 78 engages shoulder 52 on the drill collar, the sleeve cone apex is substantially coincident with the mandrel cone apex, whereby the sleeve is fully supported radially by the mandrel. There is therefor no tendency for the sleeve to move laterally relative to the collars when the sleeve contacts the well bore.

Since the most flexible part of the lower drill string assembly comprising a pair of drill collars 27 and a torque sleeve 28 is adjacent the sleeve and since the assembly will be buckled by compression when in use, the principal part of the assembly which contacts the wall of the well bore is torque sleeve 28, and the latter, with the radially protuberant wall contacting means provided by hard facing 72, serves the added function of a rotating replaceable wear sleeve.

Although relative rotation of torque sleeve 28 and mandrel 50 would not be seriously objectionable and is not likely in view of the friction between the engaged shoulders at its ends, the peg and slot also provide means to prevent such relative rotation. If the safety retention means provided by the peg and slot is substituted for that shown in the embodiment of the invention next to be described wherein the torque sleeve carries ribs and the assembly functions also as a stabilizer, then such anti-rotation function of the peg and slot becomes more important.

It is to be observed that when the flexible connection employing the torque sleeve 50 is in use, a substantial amount of bending can occur (exaggerated in FIG. 1) without the sleeve losing torque transmitting and fluid sealing engagement with the drill collar shoulders.

2. Second Embodiment

Figures 7, 8, 9:
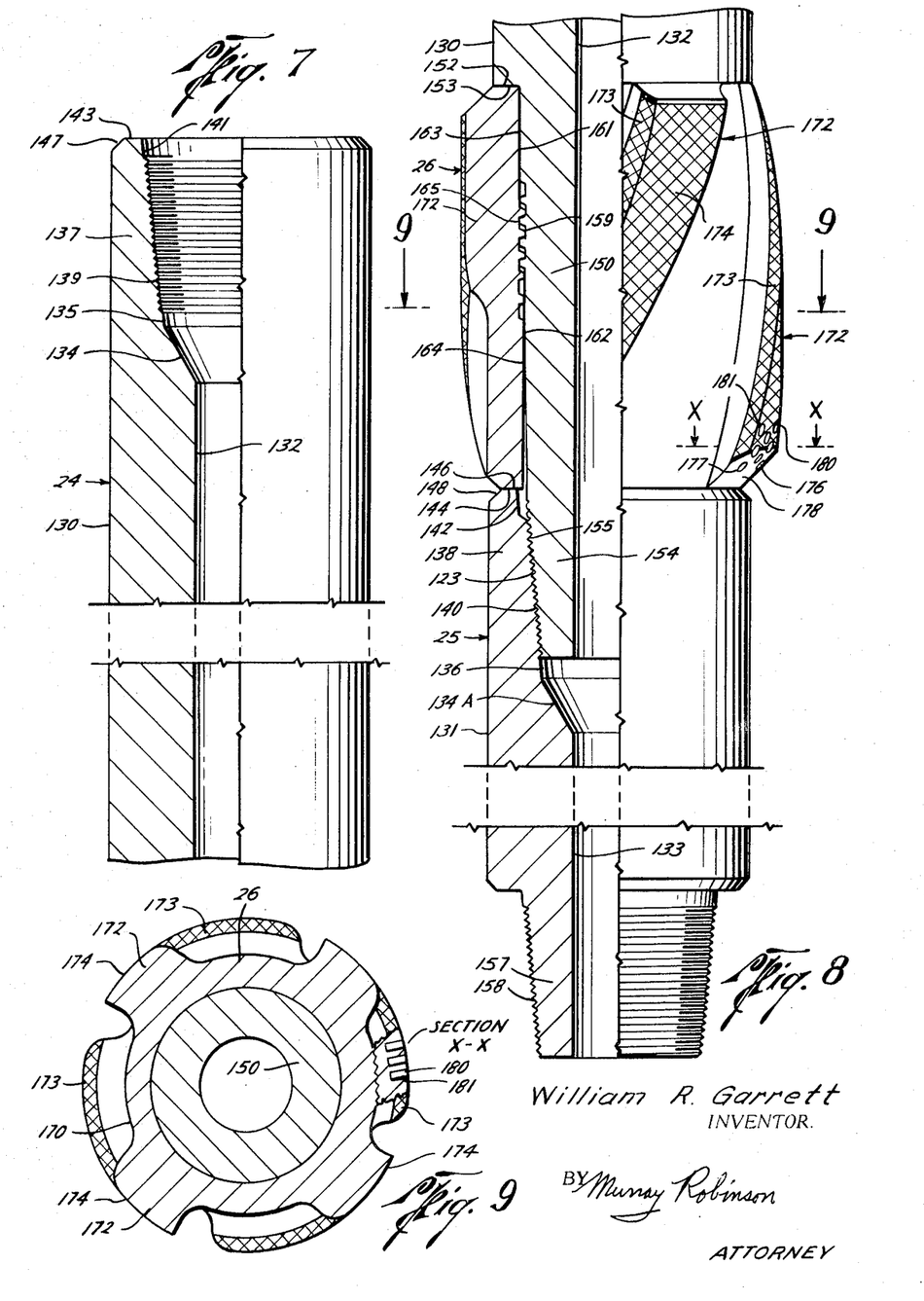
FIGS. 7 and 8 together form an elevation, partly in section, showing to a larger scale a lower drill string assembly of the form shown in FIG. 2, namely, a replaceable sleeve fixed vertical blade reamer-stabilizer.
FIG. 9 is a horizontal section taken at plane 9—9 of FIG. 8.

Referring now to FIGS. 7 and 8 there are shown the details of the reamer-stabilizers 22 connecting the drill collars 23, each such stabilizer including upper and lower subs 24, 25 and torque sleeve 26 which stabilizer members together form a lower drill string assembly in accordance with the invention. Each sub has a generally cylindrical outer periphery 130, 131, although other configurations may be used. Interiorly each sub is provided with a longitudinal fluid passage 132, 133 extending from one end of the sub to the other, passages 132, 133 also being generally cylindrical in the usual case. The ratio of the cross sectional area of the wall of each sub, taken perpendicular to the tube (longitudinal) axis of the sub, to the similarly taken cross-sectional area of the flow passages 132, 133 is in excess of three to one, the same as for drill collars. In fact, according to a variation of this embodiment of the invention, the subs 24, 25 could be replaced by drill collars having the same end structures as the subs 24, 25. For this reason the subs are shown to be of indefinite length which may either be short, e.g. the same as if there were nothing interposed at the indicated breaks, as would be a suitable length for subs, or long such as a drill collar. In another variation, sub 24 can be used and an ordinary drill collar can replace sub 25. The subs 24, 25 are made of metal, preferably steel, i.e., a high strength material the same as drill collars. Each sub is long enough to provide a tong engagable outer periphery as required for screwing them together and 6 adjacent drill string members.

At the upper end of each sub 24, 25, the flow passages 132, 133 flare upwardly at 134, 134A to merge with the upwardly flaring sockets 135, 136 of boxes 137, 138, the boxes being threaded at 139, 140 from adjacent the unthreaded mouths 141, 142 of the sockets to adjacent the bottoms of the sockets where they join the flaring transition portions 134, 134A. The ends 143, 144 of the boxes are smooth, plane, annular surfaces perpendicular to the axes of the subs adapted to make sealing engagement with other surfaces and also providing shoulders adapted to take axial compressive loading sufficient to enable torque about the sub axes to be transmitted by frictional engagement with another surface, e.g. the pin shoulder at the lower end of a drill collar 23 in the case of surface 143 on upper sub 137, and the lower end 146 of torque sleeve 26 in the case of surface 144 on the upper end of sub 25. Preferably the outer rims of the ends of the boxes are beveled as shown at 147, 148.

At the lower end of sub 24 the sub is of reduced outer diameter compared to the diameter of the outer periphery 130 of the main body portion of the sub forming a pin including a downwardly tapered mandrel 150. At the juncture of mandrel 150 and the main body of the sub is formed a downwardly facing shoulder 152. Shoulder 152 provides a plane, smooth, annular surface perpendicular to the axis of the sub and adapted to make sealing engagement with another surface, e.g., the upper end surface 153 of torque sleeve 26, and adapted to take axial compressive loading sufficient to enable torque about the sub axis to be transmitted by frictional engagement with such other surface.

The lower end of mandrel 150 is provided with a tapered screw 154 having a thread 155 for engagement with the similar thread 140 of the box 138 on sub 25. The lower end of sub 25 is provided with a tapered pin 157, threaded at 158, for engagement with the thread of the box of the upper end of a drill collar 23, such box being the same as the boxes 137, 138 at the upper ends of subs 24, 25, and pin 157 being the same as the screw 154 at the lower end of sub 24. The thread forms for box threads 123, 139, and for pin threads 155, 158 may be the same as shown in FIGS. 5 and 6.

As shown in FIG. 8 the mandrel 150 is tapered, e.g., with a taper of one-half inch per foot, flaring upwardly from pin 154 to shoulder 152. The mandrel is smooth except for a thread 159. Thread 159 is preferably coarse, flat crested and steep flanked, having the proportions shown in FIG. 11. The dimensions given are suitable for an assembly to be used in a hole of 9⅞ to 12¼ inch diameter. The thread crest cone is on the same conical surface as the upper portion 161 of the outer periphery of the mandrel 150, and the interthreaded space cone is on the same conical surface as the lower portion 162 of the outer periphery of the mandrel 156. The thread 159 thus forms a spiral helical shoulder between the lands formed by the upper and lower portions of the outer periphery of mandrel 150.

Referring now to FIGS. 8 and 9, the metal torque sleeve 26 is disposed around the mandrel 150. The sleeve is preferably made of a metal having a modulus of rigidity substantially the same as that of the drill collars, preferably a steel, i.e., a high strength material.

The inner periphery of sleeve 26 is a smooth conical surface tapered in two steps providing lands 163, 164 correlative to the conical surfaces 161, 162 of mandrel 150, with a thread 165 forming a spiral helical shoulder therebetween. The cone tapers are such that when the upper end 153 of sleeve 26 is adjacent shoulder 152 on upper sub 24, the apices of the conical surfaces 161, 163 are coincident, as are those of conical surfaces 162, 161, whereby the sleeve is fully supported radially by the mandrel.

Torque sleeve thread 165 engages with mandrel thread 159 to provide safety retention means limiting relative axial movement of the sleeve and mandrel to prevent loss of the sleeve in case the screw 154 breaks off. This retention means also keeps the sleeve and upper sub assembled as a unit in case of sale separately from the lower sub for use between conventional drill collars.

The ends 146, 153 of the sleeve 26 are smooth plane surfaces perpendicular to the sleeve axis and are adapted to seal with the surfaces of the shoulders 144 and 152 and to transmit therebetween torque about the sleeve axis by frictional engagement therewith when the sleeve is compressed between the shoulders by box 138 being made up tight on screw 154. There is sufficient axial clearance between threads 165 and 159 to permit such sleeve compression without interference by these threads. The thread 165 is similar to thread 159 and preferably is coarse, flat crested and steep flanked, having the proportions shown in FIG. 10. Note that for both threads 159, 165, the spaces between the threads are twice as wide as the threads, providing axial play equal to the thread widths.

The make up of box 138 on screw 154 and the resultant axial compression of torque sleeve 26 and the tension in mandrel 150 and the flank stress thereby produced on the threads 140, 155 of the box and pin preventing the box and pin from unscrewing are the same as in the case of torque sleeve 28 compressed axially by make up of screw 53 and box 37 of the first described embodiment of the invention, e.g. a compressive stress near to but below the yield point, at least 50,000 lb. per sq. in.

The outer periphery 170 of torque sleeve 26 (see FIG. 9) may be generally cylindrical, preferably of the same diameter as the subs 24, 25. Radially protuberant from the outer periphery of the torque sleeve 26 is wall contacting means comprising one or more, e.g., four, preferably helical ribs 172. The ribs are sufficient in number and circumferential extent to provide centralizing means to position the reamer-stabilizer with its axis substantially concentric with the well bore 18 (FIG. 2). For example one helical rib of over 180° extent, preferably 360° extent will achieve the end of providing centralizing means, whereas at least two straight ribs of substantial width, or preferably three straight ribs would be required to provide such means. As shown, the four helical ribs combine to provide approximately 240° of wall contacting surface divided into four equally spaced-apart areas.

As best shown in FIG. 9, the outermost part of the leading side 173, for the conventional clockwise direction of rotation of a drill string indicated by the various screw threads all being right handed, and the outer periphery 174 of each rib are provided with welded or sintered tungsten carbide hard facing, the same as the hard facing 72 of the previously described embodiment of the invention, except that the tungsten carbide 174 on the outer periphery is not protuberant, being flush with the outer periphery of the metal rib, there being exposed metal at each end of the rib. These are the surfaces that rub over the inner periphery of the well bore as the drill string rotates and the torque sleeve 26 is performing its centralizing or stabilizer function, so that a wear resistant surface is desired. At the lower end of each rib, however, when the torque sleeve is performing its reamer function, the welded on hard facing would be likely to be torn off by the shear forces created by reaming torque. The lower end of each rib is therefore provided with a plurality of tungsten carbide plugs 176 set into sockets 177 in the lower end face 178 of the rib and like plugs 180 set into sockets 181 in the outer periphery of the rib adjacent the lower end thereof. Preferably the plugs and sockets are cylindrical and the axes of the end face plugs 176 and sockets 177 are vertical, i.e., parallel to the torque sleeve axis, whereas the axes of the side face plugs 180 and sockets 181 are horizontal and substantially radial to the torque sleeve axis. The plugs preferably have lengths at least 50% as great as their diameters or widths so as to prevent them from popping out when subjected to forces transverse to their cylinder axes. The plugs are preferably initially ground off flat and flush with the adjacent outer surfaces of the ribs.

Viewing the threads 159, 165 of the mandrel 150 and sleeve 26 in connection with the fact that sleeve 26 carries ribs 172 and functions as a reamer-stabilizer, it will be apparent that threads 159, 165 provide means for transmitting torque between the mandrel and sleeve should the ends of the torque sleeve slip relative to the shoulders on the mandrel and lower sub or drill collar box. Such slippage may occur if excessive reaming torque is placed on the assembly.

It is also to be observed that as in the first described embodiment, upon box 138 being made up sufficiently tight on screw 154 the resultant tight engagement of the ends of torque sleeve 26 with the end of the box and the shoulder at the upper end of the mandrel provides fluid tight sealing preventing the escape of drilling fluid from the fluid passageways through the subs. Also, as in the previously described embodiment of the invention, the friction created between the pairs of engaged shoulders 144–146 and 152–153 is sufficient to transmit the required drilling torque without substantial transmission of such torque through mandrel 150 and screw 154, and, in addition, the friction between shoulders 152, 153 is sufficient to transmit the torque required to rotate the sleeve of the reamer-stabilizer in engagement with well bore 18.

Since, in the second embodiment of the invention just described, the ribs of the reamer-stabilizer provide protuberant wall contacting means which centralize the lower drill string assembly, there will be less deviation of this part of the drill string from the axis of the well bore despite loading in excess of the critical tending to cause buckling. This centalizing effect combines with that of the torque sleeve in maintaining the integrity of the assembly to transmit torque and seal fluid tight.

When the stabilizer ribs become sufficiently worn that it is to replace the torque sleeve, the typical procedure is as follows:

1. Place tongs at points on upper and lower subs immediately above and below torque sleeve.

2. Using rig power, break out connection at screw and box between upper and lower subs and remove lower sub.

3. Unscrew torque sleeve and slip it off of mandrel. Tongs may be required to break sleeve loose.

4. Lubricate portion of mandrel that was under the sleeve, using drill collar dope.

5. Lubricate inside of sleeve; lubricate shoulders.

6. Screw sleeve onto mandrel until it shoulders hand tight against mandrel shoulder.

7. Using chain tongs, bump sleeve to insure its upper end is in contact with mandrel shoulder. The threads 159, 165 will then be in the relative position shown in FIG. 8, with space between the upper side or flank of the sleeve thread and the lower side or flank of the mandrel thread.

8. Lubricate pin screw.

9. Replace lower sub on upper sub and screw them together hand tight.

10. With rig tongs placed on upper sub and lower sub immediately above and below sleeve, tighten assembly to 10,000 to 80,000, e.g., 48,000 lb.-ft. of torque, depending on size of the stabilizer, the higher torques corresponding to stabilizers of larger diameters.

Figure 10:
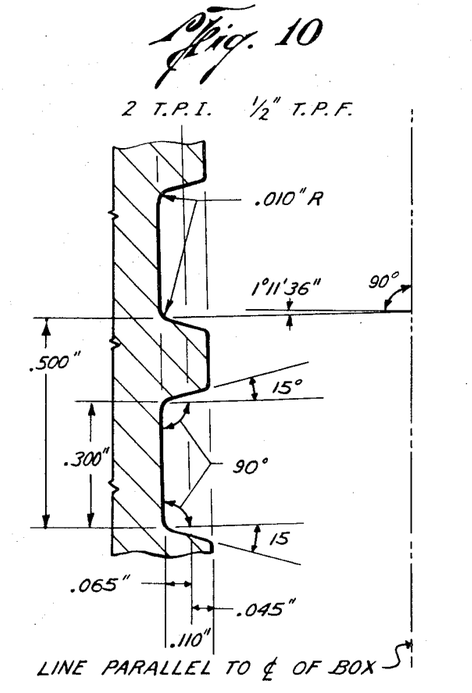
FIGS. 10 and 11 are vertical fragmentary sections to an enlarged scale showing the threads of the axial travel limit and antirotation means used in the reamer-stabilizer shown in FIG. 8.
Figure 11:
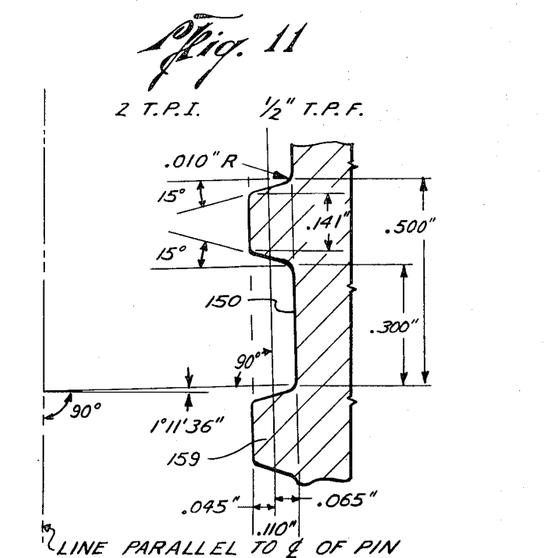

The space between the thread flanks referred to above in step 7 permits such tightening as specified by step 10 without interference. The axial clearance provided by such space is greater than the degree of shortening (compression) of the torque sleeve between the pin shoulder and most remote engaged mandrel thread under the axial stress produced by the applied torque. For example, as shown in FIGS. 10 and 11, the axial clearance is 0.100 in., which is considerably greater than the axial compression, e.g., 0.025 in. for the whole sleeve as previously calculated, or 0.012 in. for the distance from the pin shoulder to the most remote engaged mandrel thread.

Because very coarse threads 159, 165 are used to retain in the sleeve 172 on the mandrel 150 and to provide a drive for the sleeve from the mandrel, the pitch of these threads is much greater than that of the A.P.I. standard threads 140, 155 used to connect the pin screw 154 to the box 138 of the lower sub 25. The pitch of the sleeve-mandrel threads is such as to provide only two threads per inch whereas the pitch of the threads connecting the pin screw and the lower sub box is such as to provide four threads per inch. Normally, such a great difference in pitch would cause the lower sub to become locked to the upper sub after the tight make up required to place the torque sleeve in compression. The torque-transmitting, frictional engagement at shoulders 144, 146 is such that when the box is unscrewed from the pin screw, the box tends to cause the torque sleeve to unscrew from the mandrel. Due to the difference in pitch, the mandrel wants to move axially faster than the box but the abutting engagement of shoulders 144, 146 prevents such faster axial movement of the sleeve. This might lock the box on the pin and prevent unscrewing of the connection were it not for the fact that the play between threads 159, 165 allows the sleeve to turn with the box without making such extra axial movement. Once the pin screw and sub box connection has become slightly unscrewed to relieve the axial stress in the torque sleeve, the sub box unscrews readily from the pin screw. Thereafter, despite the lesser taper (one-half inch per foot) of the mandrel than the pin screw (2 inches per foot) the torque sleeve can be unscrewed from the mandrel with fewer turns than required to unscrew the sub box from the pin screw, because of the greater pitch of the mandrel thread compared to the pin screw thread and because of the small axial extent of the mandrel thread, which results in there being only four engaged mandrel threads, compared to about 16 on the pin screw. This permits easy, rapid replacement of the torque sleeve whenever desired.

If by mistake, in attempting to break the pin screw to lower sub box conection for the purpose of replacing the sleeve, the rig tongs are placed on the sleeve and upper sub instead of on the upper and lower subs, the torque sleeve would try to back away from the pin shoulder and would make up even tighter against the box end of the lower sub. This would tend to lock the sleeve to the lower sub even more than the intial compression of the torque sleeve. However, because of the axial clearance between the mandrel and torque sleeve, upon correct application of the tongs to the subs above and below the sleeve the lower sub can be readily unscrewed from the upper sub.

While preferred embodiments of the invention have been shown and described, modifications thereof can be made by one skilled in the art without departing from the spirit of the invention.

In defining the invention in the hereinafter appended claims, some consideration has been given not only to the prior art described hereinabove but also to the following U. S. Pats., Nos. 2,636,753 & 2,745,685 (Moore), No. 2,825,585 (Griffin), No. 3,054,647 (Von Rosenberg), No. 3,063,759 (Moore, Bachman, and Rollins), No. 3,285,678 (Garrett and Crews), and No. 3,306,381 (Garrett and Moore).

I claim:

1. A lower drill string assembly comprising: a first metal member having a flow passage therethrough, said first member having a body whose wall has a cross-sectional area transverse to the axis of said flow passage that is at least two times the cross-sectional area of said flow passage, said first member having at one end a pin of reduced outer perimeter and wall thickness compared to that of said body forming an external shoulder between the pin and body, said shoulder having a first annular sealing surface extending about the flow passage through said member and adapted to seal with a correlative metal sealing surface, said pin including a first connector portion located at a distance from said shoulder, said connector portion being exteriorly conically tapered in a direction flaring toward said shoulder and being exteriorly screw threaded, said pin including between said shoulder and connector portion a sleeve receiving portion adapted to receive the hereinafter mentioned torque sleeve, a second metal member having a flow passage therethrough, said second member having a body whose wall has a cross-sectional area transverse to the axis of said flow passage that is at least twice the cross-sectional area of said flow passage, said second member including adjacent one end thereof a second connector portion of reduced wall thickness compared to that of said body, said second connector portion being interiorly conically tapered in a direction flaring toward said one end of said second member and being interiorly screw threaded and engageable with said first connector portion, said second member including a second annular sealing surface extending around said fluid passage therethrough, and a metal torque sleeve carried by said sleeve receiving portion of said pin, said sleeve having oppositely facing annular sealing surfaces thereon respectively engageable with said first and second sealing surfaces of said members to seal therewith and being adapted, when the sleeve is compressed between said shoulders by engagement of said connector portions of said members sufficient to place said pin in tension, to transmit between said shoulders torque acting about the axis of the sleeve.

2. Assembly according to claim 1 wherein the torque sleeve has a modulus of rigidity of the same order of magnitude as that of said first and second members.

3. Assembly according to claim 1 wherein the sleeve is axially compressed to produce a stress of at least 50,000 lbs. per square inch but less than the yield stress of the sleeve and said members.

4. Assembly according to claim 1 wherein the sleeve has a length of at least about the same order of magnitude as the diameter of said members.

5. Assembly according to claim 1 including wall contacting means affixed to the outer periphery of the sleeve and extending out radially beyond the outer periphery of said members.

6. Assembly according to claim 5 wherein the outer periphery of the sleeve, excluding said wall contacting means, is of substantially the same diameter as the outer periphery of said first and second members, and said wall contacting means comprises a layer of hard facing material secured to the outer periphery of the sleeve.

7. Assembly according to claim 5 wherein said wall contacting means comprises a plurality of blades secured to said sleeve at circumferentially spaced apart positions providing fluid passages therebetween.

8. Assembly according to claim 7 wherein each blade is provided at its outer periphery with a layer hard facing material welded thereto and at its lower end with a plurality of apertures into which are inset bodies of hard facing material.

9. Assembly according to claim 1 including retention means holding said sleeve to said sleeve receiving portion of the pin even if said screw threaded connector portion of the pin should break off.

10. Assembly according to claim 9 wherein said retention means comprises protuberant means on one of said pin and sleeve extending into an opening in the other with play therebetween in the direction of the sleeve axis.

11. Assembly according to claim 10 wherein said protuberant means comprises a peg extending inwardly from said sleeve and said opening is a slot in said sleeve receiving portion of the pin.

12. Assembly according to claim 11 wherein the slot extends in the direction of the sleeve axis a distance as great as the length of the threaded connector portion of the pin that is engaged by the second threaded connector portion.

13. Assembly according to claim 10 wherein said protuberant means comprises a thread on said sleeve extending inwardly therefrom and said opening is the space between turns of a thread on said sleeve receiving portion.

14. Assembly according to claim 13 wherein the play between the flanks of the threads on said sleeve and said sleeve receiving portion of the pin is of the same order of magnitude as the width of said threads.

15. Assembly according to claim 13 wherein the pitch of the threads on said sleeve and said sleeve receiving portion of the pin exceeds the pitch of the threads on said connector portions of said members.

16. Assembly according to claim 13 wherein the inner periphery of said sleeve and the outer periphery of said sleeve receiving portion of the pin are correlatively tapered but have a lesser taper than that of said threaded connector portions of said members.

17. Assembly according to claim 13 wherein said threads on said sleeve and said sleeve receiving portion have fewer turns than said threads on said threaded connector portions of said members.

18. Assembly according to claim 13 wherein fewer rotations are required to unscrew said sleeve from said sleeve receiving portion than are required to unscrew said threaded connector portions of said members.

19. Method of connecting lower drill string members having shouldered pin and box connectors thereon comprising placing around the pin a torque sleeve of a length as great as the diameter of the members and then screwing the pin and box together with torque sufficient to produce an axial stress of at least 50,000 pounds per square inch in the sleeve.

20. A lower drill string member comprising a thick walled tubular body providing a flow passage from one end to the other and having means at each end for making fluid sealing, torque transmitting, connection with another lower drill string member capable of taking axial stress and bending moment, said means at one end comprising a pin of smaller transverse extent than said body forming therebetween a shoulder, said pin having at its end remote from said shoulder a tapered threaded screw adapted to engage a correlative box on an adjacent lower drill string member, said pin including a mandrel between said shoulder and screw, said mandrel having a length of at least the same order of magnitude as the transverse extent of said tubular body, and
retention means carried by said mandrel for engagement with a torque sleeve to be disposed on said mandrel between said shoulder and said box.

21. Lower drill string member according to claim 20, said retention means comprising a slot extending longitudinally on said mandrel.

22. Lower drill string member according to claim 21, said slot having a longitudinal extent of at least the same distance as the axial extent of said screw.

23. Lower drill string member according to claim 22, said retention means comprising a thread on said mandrel, said thread being narrower than the space between the thread turns.

24. Lower drill string member according to claim 25, said mandrel being stepped providing upper and lower lands, the upper land being of larger outer diameter than the lower land, said thread forming the juncture between the smaller diameter land and the larger diameter land.

25. Lower drill string member according to claim 21, in combination with a torque sleeve disposed on said mandrel and held thereon by said retention means, said retention means allowing limited relative axial motion of said member and sleeve of at least a distance of the order of magnitude of the compression of the sleeve when axially stressed to near the yield point, i.e., to 50,000 pounds per square inch.

26. Combination of claim 25 including means to transmit torque from said mandrel to said torque sleeve.

27. Combination of claim 25, said retention means comprising an opening in said mandrel and a peg screwed through a radial hole in said sleeve and extending into said opening.

28. Combination of claim 25, said retention means comprising a thread on the interior of said sleeve axially loosely engaging a thread on the exterior of said mandrel.

29. Combination of claim 28, said mandrel being tapered and stepped to provide upper and lower tapered lands, the interior of said sleeve being correlatively shaped, said mandrel lands fitting snugly inside said sleeve lands, said threads on said sleeve and mandrel forming the junctures of the lands.

30. Combination of claim 25 including wall contacting means on the exterior of said sleeve.

31. Combination of claim 27, said wall contacting means comprising a generally cylindrical layer of hard facing material attached to the outer periphery of said sleeve, the outer periphery of said layer having a larger diameter than the outer diameter of said tubular body.

32. Combination of claim 31 including means to transmit torque from said mandrel to said sleeve independently of said pin shoulder.

33. Combination of claim 30, said wall contacting means comprising rib means extending radially from the outer periphery of said sleeve.

34. Combination of claim 32, said retention means also serving to transmit torque directly from said mandrel to said sleeve.

35. Combination of claim 32, said rib means being provided with hard facing material welded to its outer periphery and leading edge (as judged from the hand of said tapered threaded screw), said rib means being provided with sockets at its lower end into which are received inserts of hard material, said sockets having depths greater than the transverse dimension of said inserts.

36. A torque sleeve for transmitting torque between lower drill string members, said sleeve having a length greater than its inner diameter, the ends of said sleeve being planar providing sealing and torque transmitting surfaces, said sleeve having wall contacting means on its outer periphery, the inner periphery of said sleeve having retention means thereon adapted for cooperation with means on a lower drill string member to retain the sleeve on the member, said retention means comprising a threaded peg screwed into a threaded radially disposed hole in said sleeve and extendable radially inwardly thereof.

37. A torque sleeve for transmitting torque between lower drill string members, said sleeve having a length greater than its inner diameter, the ends of said sleeve being planes providing sealing and torque transmitting surfaces, said sleeve having wall contacting means on its outer periphery, the inner periphery of said sleeve having retention means thereon adapted for cooperation with means on a lower drill string member to retain the sleeve on the member, said retention means comprising a helical thread on the interior of the sleeve, the width of the thread being less than the distance between turns of the thread by an amount at least as great as the compression of the sleeve from one end of the sleeve to the remote end of the thread under a compressive stress of 50,000 pounds per square inch.

38. Sleeve according to claim 37, said thread on the sleeve being flat crested and having steep flanks, e.g., of the order of 15° to the plane perpendicular to the sleeve axis, and a coarse pitch, e.g., of the order of two threads per inch.

39. Sleeve according to claim 37, the interior of said sleeve being tapered and stepped providing larger and smaller diameter lands with the thread forming a helical shoulder therebetween.

40. A sleeve replacement for a replaceable sleeve blade stabilizer, said sleeve comprising a tubular body having smooth ends providing sealing and torque transmitting shoulders, and a plurality of ribs spaced circumferentially about the body and extending radially therefrom forming fluid passages therebetween, each of said ribs having hard facing material welded to the outer periphery thereof and having sockets in the lower end thereof receiving hard inserts, said sockets having depths at least 50 percent as great as their widths.

41. Sleeve according to claim 40, some of said sockets in each rib extending substantially parallel to the sleeve axis from the under side of the rib and some of said sockets in each rib extending substantially radially into the outer periphery of the rib at the lower end of the rib.

42. Sleeve according to claim 40, said inserts being flush with the adjacent portions of the ribs.

* * * * *